(12) United States Patent
Durai

(10) Patent No.: US 9,524,312 B2
(45) Date of Patent: *Dec. 20, 2016

(54) PRIORITIZED, INCREMENTAL DATA RETRIEVAL FROM A DATABASE, WITH AN EVENT LISTENER

(75) Inventor: Ponnusamy Jesudoss Durai, Meridian (ID)

(73) Assignee: IANYWHERE SOLUTIONS, INC., Dublin, CA (US)

(*) Notice: Subject to any disclaimer, the term of this patent is extended or adjusted under 35 U.S.C. 154(b) by 119 days.

This patent is subject to a terminal disclaimer.

(21) Appl. No.: 12/432,330

(22) Filed: Apr. 29, 2009

(65) Prior Publication Data

US 2010/0280993 A1 Nov. 4, 2010

(51) Int. Cl.
*G06F 17/30* (2006.01)

(52) U.S. Cl.
CPC ... *G06F 17/30353* (2013.01); *G06F 17/30368* (2013.01)

(58) Field of Classification Search
CPC ............ G06F 17/30353; G06F 17/30368; G06F 17/30082
USPC ............ 707/609, 637, 812, E17.009
See application file for complete search history.

(56) References Cited

U.S. PATENT DOCUMENTS

| | | | |
|---|---|---|---|
| 4,302,808 A * | 11/1981 | Zanchi et al. ......... G06F 13/26 710/116 | |
| 5,377,354 A | 12/1994 | Scannell et al. | |
| 5,469,571 A * | 11/1995 | Bunnell ................ 718/103 | |
| 5,974,465 A * | 10/1999 | Wong ................... 709/234 | |
| 6,006,269 A * | 12/1999 | Phaal .................. H04L 12/2602 709/227 | |
| 6,055,564 A * | 4/2000 | Phaal .................. H04L 67/1002 709/207 | |
| 6,356,633 B1 | 3/2002 | Armstrong | |
| 6,445,774 B1 * | 9/2002 | Kidder et al. ............ 379/9.03 | |
| 6,611,519 B1 | 8/2003 | Howe | |
| 6,810,503 B1 * | 10/2004 | David et al. ............ 715/201 | |

(Continued)

OTHER PUBLICATIONS

Non-final Rejection mailed Dec. 14, 2010, for U.S. Appl. No. 12/432,425, filed Apr. 29, 2009, 9 pgs.

(Continued)

*Primary Examiner* — Shiow-Jy Fan
(74) *Attorney, Agent, or Firm* — Sterne, Kessler, Goldstein & Fox P.L.L.C.

(57) ABSTRACT

Systems, methods, computer program product embodiments for an active/push notification façade for a passive database are described herein. An embodiment includes an event listener configured to poll (or query) a passive database and selectively retrieve data objects based on the poll results. Such a selective database read operation may be based on the priority of an event occurring in the passive database. If events of a low priority occur, the event listener does not open the passive database immediately to retrieve additional information related to the low priority event but defers reading the passive database by a pre-determined amount of time. If a higher priority event occurs, the passive database is immediately read to retrieve details related to the high priority event from the passive database. In another embodiment, event listener reads the passive database based on event timestamp information in the passive database and stored timestamp information.

18 Claims, 9 Drawing Sheets

(56) References Cited

U.S. PATENT DOCUMENTS

| | | | |
|---|---|---|---|
| 6,910,070 B1* | 6/2005 | Mishra et al. | G06F 9/542 |
| | | | 707/999.201 |
| 6,971,088 B1* | 11/2005 | Mimura | 717/127 |
| 7,092,707 B2 | 8/2006 | Lau et al. | |
| 7,120,865 B1 | 10/2006 | Horvitz et al. | |
| 7,281,201 B2 | 10/2007 | Kumar et al. | |
| 7,305,402 B2 | 12/2007 | Hind et al. | |
| 7,324,510 B2 | 1/2008 | Howe | |
| 8,200,768 B2 | 6/2012 | Durai | |
| 2002/0078161 A1* | 6/2002 | Cheng | 709/208 |
| 2002/0138670 A1* | 9/2002 | Johnson | 710/6 |
| 2004/0193569 A1* | 9/2004 | Shane | G06F 17/30067 |
| 2006/0074621 A1* | 4/2006 | Rachman | 703/22 |
| 2008/0201383 A1* | 1/2008 | Honigfort | 707/200 |

OTHER PUBLICATIONS

Final Rejection mailed Jun. 27, 2011, for U.S. Appl. No. 12/432,425, filed Apr. 29, 2009, 6 pgs.

Notice of Allowance mailed Feb. 29, 2012, for U.S. Appl. No. 12/432,425, filed Apr. 29, 2009, 11 pgs.

\* cited by examiner

PRIORITIZED, INCREMENTAL DATA RETRIEVAL FROM A DATABASE, WITH AN EVENT LISTENER

CROSS REFERENCE TO RELATED APPLICATIONS

This patent application is related to U.S. patent application Ser. No. 12/432,425, filed on Apr. 29, 2009, entitled "Deferred Reading of Email Databases in Mobile Environments," and to U.S. patent application Ser. No. 12/104,905 filed on Apr. 17, 2008, entitled "Synchronizing Communications and Data Between Mobile Devices and Servers," both of which are incorporated by reference herein in their entireties.

FIELD OF THE INVENTION

The present invention relates generally to database systems and, more particularly, to the synchronization of data changes in a passive database system by a client device.

BACKGROUND

Modern computer networks have lead to an increased use of distributed database systems. To facilitate different applications, distributed database systems may rely upon an exchange of data between distributed parts. One type of information exchange, or replication, involves the detection and transfer of newly added or modified information from one database to another location. An example system that uses distributed database replication is an email system. Such a system detects changes and synchronizes different types of data objects: emails, calendar appointments, application data, business process tasks, and other types of information between mobile client devices and an email server.

Databases may have different capabilities with respect to synchronization. Some systems—so called "active notification" or "push" systems—may actively respond to data changes by pushing these changes out to connected parts of distributed database systems. In a push system, the server may initiate a data transfer without a specific request from the client. In an email context, this push system may respond to a new email by actively notifying the client device and transferring the email to the remote system. The client device would not have to request any updates.

Another approach to database synchronization involves the so-called "passive" or "pull" system. In this type of system, the database server generally does not initiate a transfer without a specific request from a client system. These pull systems may rely upon a "polling" mechanism, wherein a client system periodically requests any updates that are available on the server system, and the server then responds with any outstanding updates. In an email context, this approach may involve a server receiving an email, a client polling the server for changes and the email being transferred in response to the polling.

A system that exhibits the benefits of both active/push systems and passive/pull systems would be desirable.

BRIEF SUMMARY

Briefly stated, the invention includes system, method, computer program product embodiments and combinations and sub-combinations thereof for an active/push notification facade for a passive database (or passive system).

An embodiment includes an event listener configured to poll (or query) the passive database.

The event listener selectively reads the passive database based on the priority of an event detected. As an example, an operation that includes retrieval of a data object may be a low priority event. Events such as creation of a new data object in the passive database may be categorized as a high priority event.

If events of a low priority occur, the event listener does not open the passive database immediately to retrieve additional information related to the low priority event but defers its action of reading the passive database by a pre-determined period of time. If a higher priority event occurs, the passive database is more immediately opened to read details related to the high priority event from the passive database. Therefore, for a low priority event, event listener proceeds to read the passive database after the lapse of a pre-determined amount of time or the occurrence of a high priority event, whichever of these events occurs first.

In another embodiment, the passive database is configured to update timestamp information for high priority events. When the event listener determines that a timestamp has been updated, it also determines that a high priority event has occurred and proceeds to access the passive database to retrieve information of related to that high priority event from the passive database.

In this way, the passive database is not read for each event, thereby saving valuable computational resources. Furthermore, by deferring reading of the passive database, information related to multiple low priority events can be retrieved by the event listener in a single read operation instead of multiple read operations. Also, in one embodiment, the event listener needs only to check timestamp(s) in the passive database to determine occurrence of high priority events that would necessitate further reading of the passive database.

Further embodiments, features, and advantages of the invention, as well as the structure and operation of the various embodiments of the invention are, described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

Figure 1:
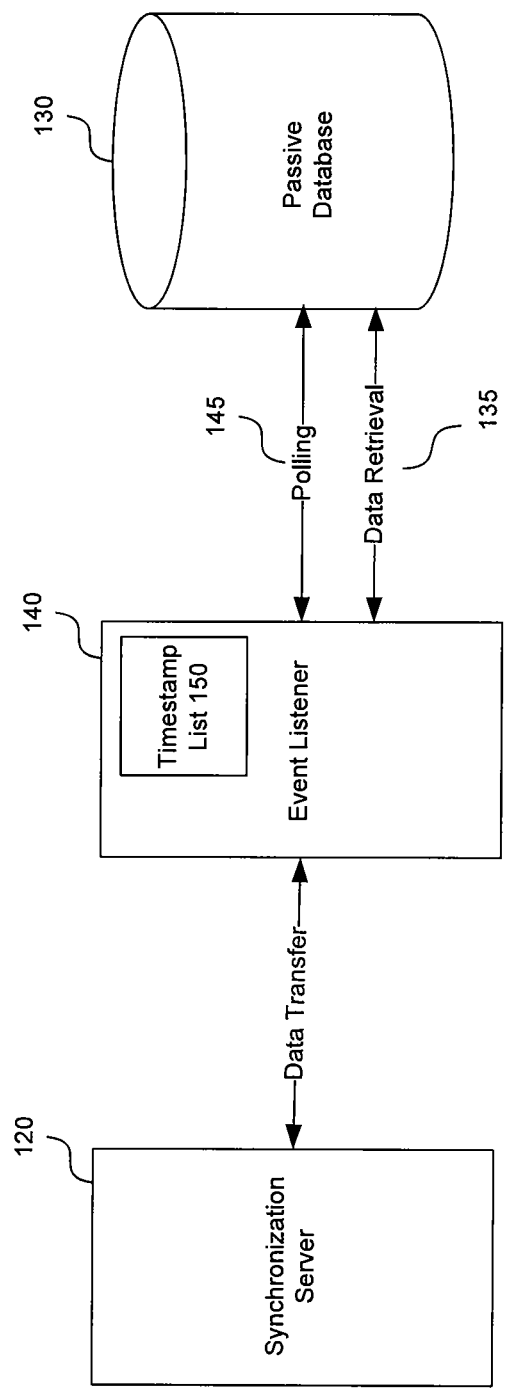
FIG. 1 depicts an active/push notification facade according to embodiments of the invention.

The features and advantages of the present invention will become more apparent from the detailed description set forth below when taken in conjunction with the drawings.

I. Overview
II. The Event Listener
III. Event Priority
IV. Polling
V. Domino Embodiment
VI. Example Computer Embodiment
VII. Conclusion

DETAILED DESCRIPTION

While embodiments are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe an active/push notification facade for a passive database in further detail.

Different embodiments will be described herein applied to different types of passive databases. It is important to note that, while certain embodiments herein are applied to passive email system databases, the teachings may be applied to a variety of different types of passive databases.

I. Overview

In the absence of an active notification system, polling (more generally querying, checking) is generally the only way for an external application to find modifications of data objects in a database system. Polling may cause problems however, the so called "naive polling" of a busy database system may lead to overloading of the system and may result in poor system performance. Embodiments described herein are designed to create an active/push notification facade (layer) for a database that uses only a passive (Pull) approach-a passive database. As described, this facade will be designed to inter alia, reduce the overloading of a server by performing more effective polling and more effective data retrieval. The term "façade" or layer is applied because in certain embodiments, the system is designed to appear to attached applications as if it were operating within an active notification system.

As used herein, according to embodiments, a "data object" may be any textual, audio, graphical, video, or written work encoded in digital form and encapsulated in a computer readable structure, such as a file, message, computer readable medium, or shared memory object; that a software application program can access and manipulate. Unless specifically stated differently, a data object is interchangeably used herein to identify an email message, application data, a calendar entry (such as an appointment in a calendar application), a web services request, a method call, a database record, a data store record, communications data or other like items well known to those with skill in the art.

Unless specifically stated to the contrary, according to embodiments, a "user" is interchangeably used herein to identify a human user, a software agent, or a group of users and/or software agents. Besides a human user who needs to synchronize email, data, and calendar entries, a software application or agent sometime needs to synchronize these items. Accordingly, unless specifically stated, the term "user" as used herein does not necessarily refer to a human being.

II. The Event Listener

Turning to FIG. 1, event listener 140 determines the occurrence of events associated with data objects in passive database or system 130. While described in terms of a "passive" database, embodiments described herein as applicable to and database or data store. As discussed below, the listener 140 determines event occurrence by polling 145 the database 130. Embodiments described below use different types of polling, each having different implications for performance and discovery latency—the time it takes to discover and retrieve a change from the database. However the invention is not limited to the polling types described below, but instead can use any polling type now known or developed in the future.

Once the event listener 140 determines that an event has occurred in passive database 130, the data may be retrieved by data retrieval 135 and transferred to another system, for example, synchronization server 120. As would be apparent to a person skilled in the relevant art, event listener 140 could use retrieved data for any use or combination of uses. One such use is described in U.S. Non-Provisional patent application Ser. No. 12/104,905, filed on Apr. 17, 2008, entitled "Synchronizing Communications and Data Between Mobile Devices and Servers" (hereinafter "Synchronization Application") which is incorporated herein by reference in its entirety. Other uses for retrieved data would be apparent to persons skilled in the art.

Although many of the following embodiments are described in terms of a general purpose passive database 130 it is to be appreciated that many other types of database servers or systems may also be used with embodiments described herein. One type of passive database that will be discussed below is the passive email server.

III. Event Priority

In embodiments, event listener 140 may selectively read passive database 130 to detect events associated with the data objects therein. In a general purpose database, detected events may include creation, reading, updating or deleting of database objects. Embodiments described herein may assign a priority to different database events, and may perform different actions depending upon this priority.

As an example, an operation in passive database 130 that includes the retrieval of a database object by a database client or the duplication of a database object, may be categorized as a low priority event. Events such as the creation or deletion of a database object may be categorized as high priority events. Events may be classified as low or high priority according to any defined criteria.

In embodiments, if events of a low priority occur, the event listener 140 does not immediately access passive database 130 to retrieve additional information related to the low priority event, but rather defers the retrieval of information from passive database 130 by a pre-determined, or calculated period of time. In embodiments, such a period of time may be configurable by a database administrator. The period of time may also be calculated by other data available to the system. For example, the period of time may be linked to the last time the database was accessed for a particular operation. As will be described below, embodiments described herein may store "timestamp" information—a record of when an action or event occurred—and this data may be used to calculate time periods.

In further embodiments, if a higher priority event occurs, passive database 130 is immediately accessed and details related to the high priority event are retrieved. At that time, details relating to any deferred, low priority events are also retrieved. Therefore, for low priority events, event listener 140 will generally access passive database 130 either after the lapse of a pre-determined amount of time, or the subsequent occurrence of a high priority event, whichever of these events occurs first. This reading of passive database 130 will be described further below in the discussion of "polling" in FIGS. 3A-B. In another embodiment, at that time, retrieval of the lower priority events remains deferred.

Figure 2:
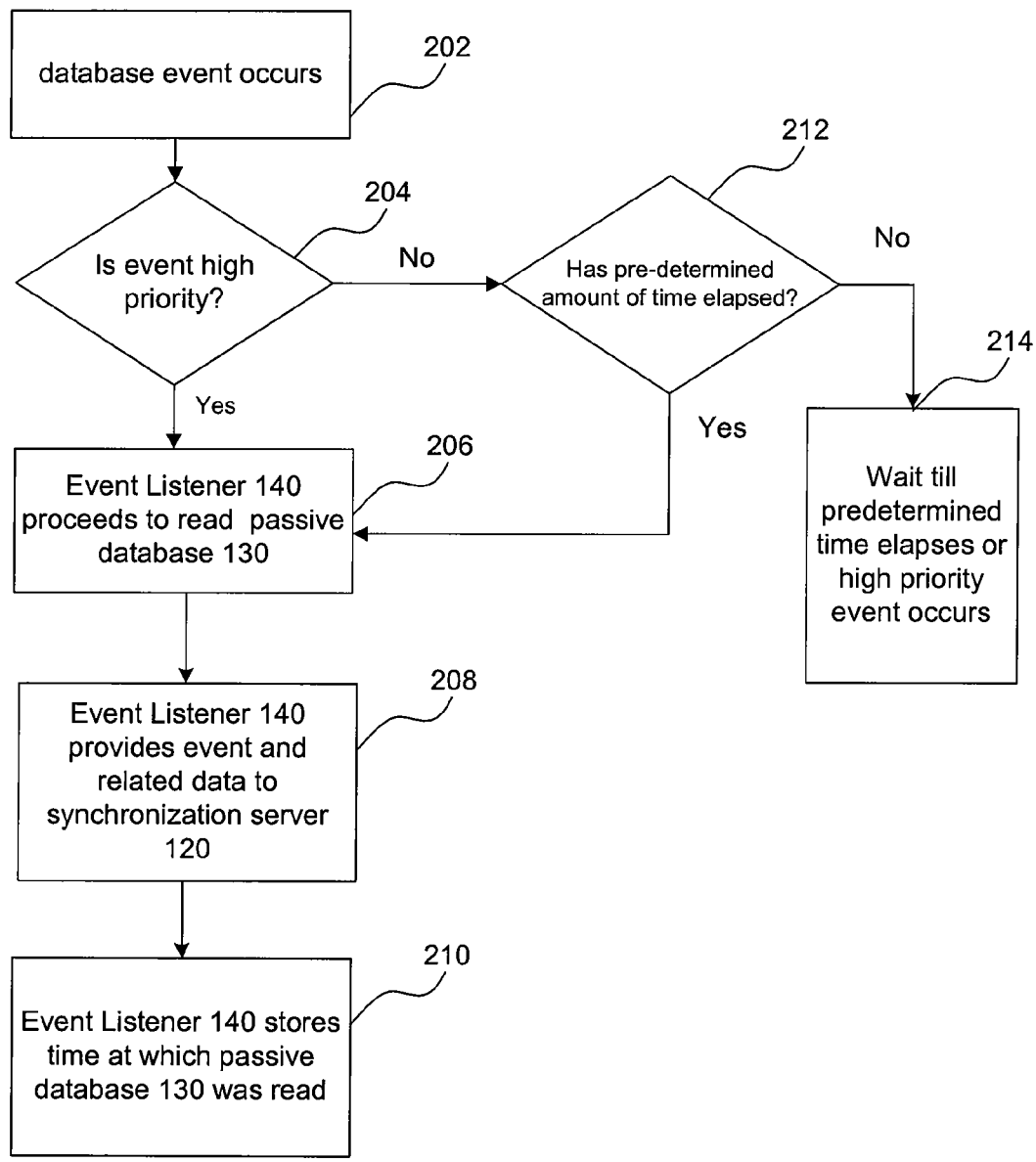
FIG. 2 depicts a method for implementing an active/push notification facade according to embodiments of the invention.

FIG. 2 shows method 200, illustrating an operation of event listener 140, according to an embodiment of the invention. In step 202, a database event occurs in passive database 130. As an example, without limiting the invention, such an event may include the creation of a data object, or the retrieval of a data object. In step 204, event listener 140 determines if the event that occurred in step 202 is a high priority event. As example, a high priority event may include the insertion of a data object. If event listener 140 determines that a high priority event has occurred (step 204), in step 206 event listener 140 proceeds to access passive database 130 to retrieve details of the high priority event. At this time, event listener 140 also retrieves details of any deferred low priority events. The details retrieved, for example, may include the primary key value of the data object inserted.

Many different uses for the retrieved data exist and would be known by one skilled in the art. For example, in step 208, event listener 140 may provide the event and data related to the event (e.g., the primary key of inserted data object) to synchronization server 120. In step 210, event listener 140 stores the time at which passive database 130 was last read in timestamp list 150.

Returning to step 204, if event listener 140 determines that the event is not a high priority event, it does not read passive database 130 and proceeds to check if a pre-determined amount of time has elapsed since passive database 130 was last checked (step 212).

If a pre-determined amount of time has elapsed (step 212), event listener 140 proceeds to read passive database 130 (step 206). If a pre-determined amount of time has not elapsed (step 212), event listener 140 proceeds to wait and does not read passive database 130 until the pre-determined amount of time elapses or until an event of high priority occurs at passive database 130 (step 214).

In this way, event listener 140 allows one or more low priority events (e.g., record retrieval events) to be read with high priority events (e.g., record insertion) or after the lapse of a pre-determined amount of time, whichever occurs first. By deferring the read operation of low priority events, embodiments of the invention may save significant processing resources.

IV. Polling

Figure 3A:
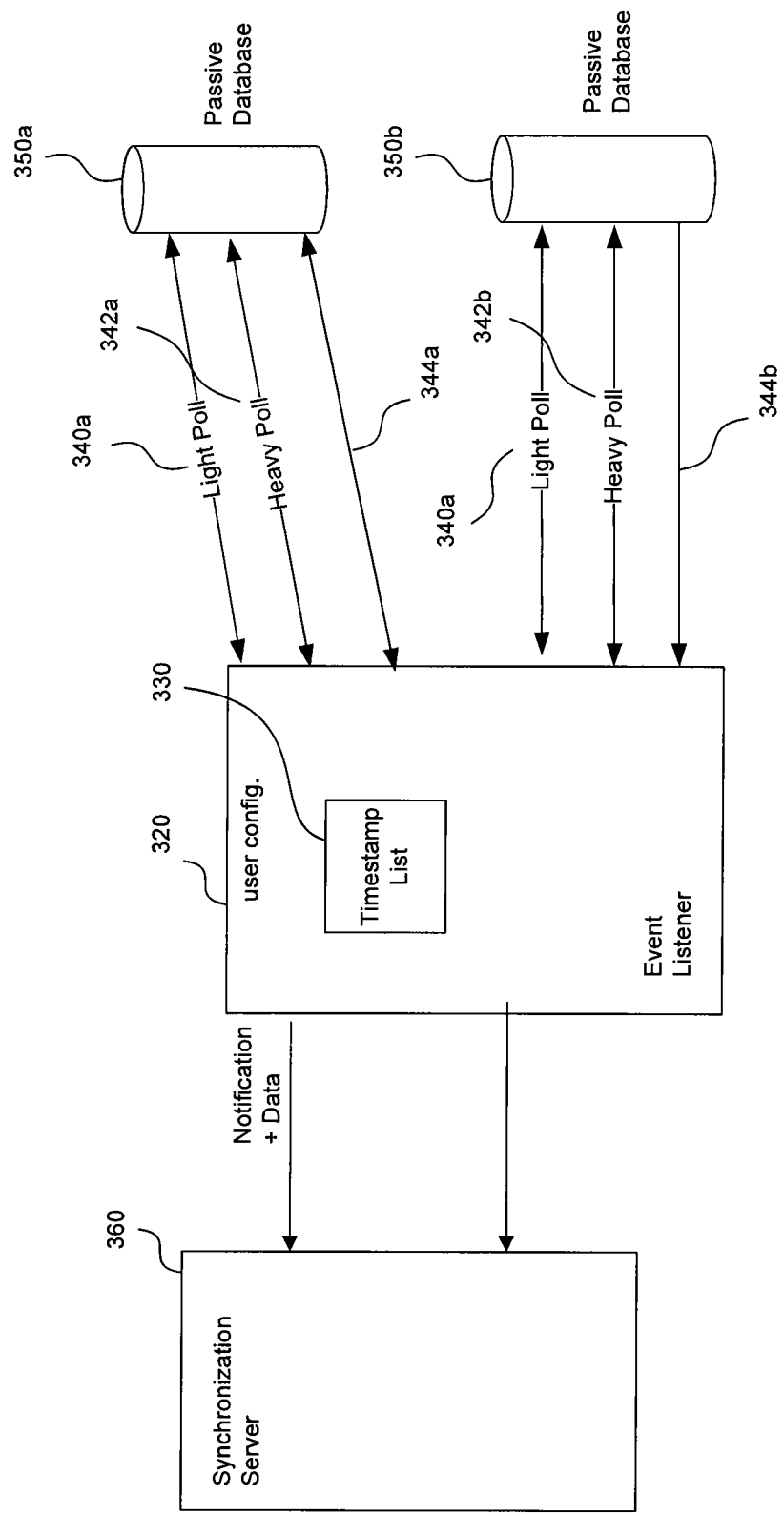
FIG. 3A is a flowchart illustrating an operation of an event listener, according to an embodiment of the invention.

Turning to FIG. 3A, in an embodiment, event listener 320 is a component that is coupled to one or more passive databases 350a-b (respectively corresponding to event listener 140 and passive database 130 from FIG. 1). In an embodiment, the event listener 320 may maintain a timestamp list 330 of the different connected passive databases 350a-b, and associated information about changes to the data within these sources. The operation of FIG. 3A is described below with reference to the method of FIG. 3B, but this is not necessarily intended to be limited to the structure of the components thereon.

Figure 3B:
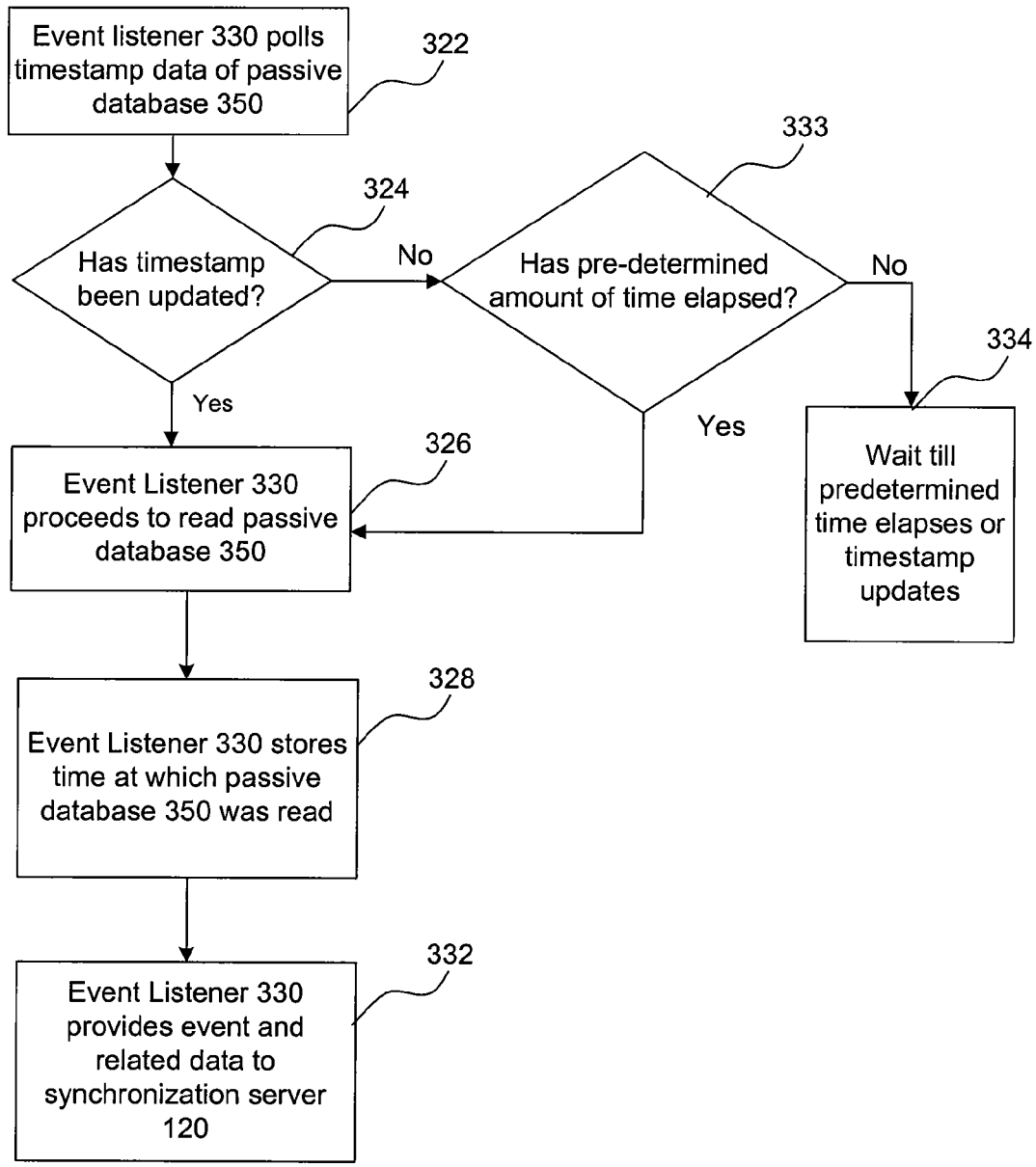
FIG. 3B is a flowchart illustrating an operation of an event listener, according to another embodiment of the invention.

FIG. 3B is method 300 illustrating the operation of event listener 320 according to an embodiment of the invention. In the following embodiment, passive databases 350a-b are only configured to store time stamps for high priority events. Therefore, as described below, event listener 320 may review timestamp information of passive databases 350a-b to identify high priority events. In another embodiment, databases 350a-b may be configured to store timestamps for high and low priority events.

This checking or review of timestamp information in a passive database may be referred to herein as lightweight polling 340a-b. This term "lightweight poll" or "lightweight polling" as used herein refers to comparing, for example, the timestamp of the data sets stored on databases 350a-b with the timestamp stored in the timestamp list 330 described above (corresponding to timestamp list 150 from FIG. 1). The timestamps may be applied to a range of different data stored on passive databases 350a-b. In one embodiment, the entire database has a single timestamp, while in other embodiments, each data object in the passive database 350a-b has an individual timestamp. In embodiments described herein, checking for an update to timestamp information by a light poll 340a-b is generally not a resource intensive operation and thus may save system resources, while preventing overloading of the passive databases. In embodiments, this light poll 340a-b may be performed based on a manual request by an administrator or may be performed at a regular, determined interval, e.g., 5 seconds. Also, as described above with respect to FIG. 1, this poll interval may be calculated.

Method 300 begins with event listener 140 performing a light poll 340a-b of passive databases 350a-b to retrieve timestamp information (step 322). In an embodiment, in step 324, event listener 140 may determine if passive databases 350a-b have any updated timestamps by comparing the retrieved timestamps from databases 350a-b with the timestamps stored in timestamp list 330. As described earlier, in this embodiment, passive databases 350a-b are configured to store timestamps for the retrieval of data related to high priority events, but other embodiments may allow the storage of timestamps for the retrieval of data related to all events.

Figure 6:
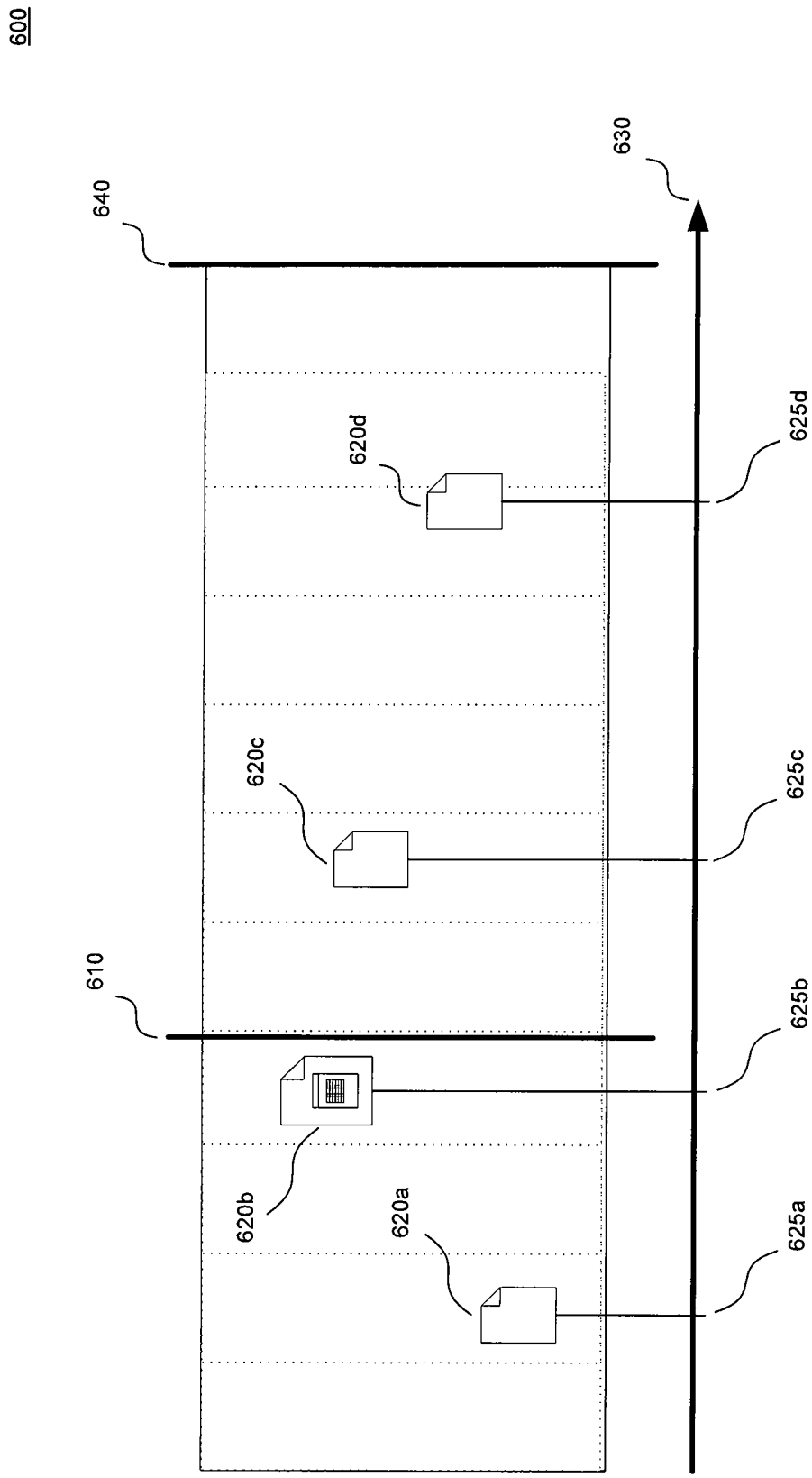
FIG. 6 depicts a timeline of data updates and retrieval, according to embodiments of the invention.

If event listener 320 determines that a time stamp has been updated (step 324), then event listener 320 thereby determines that a high priority event has occurred. As a result, event listener 320 immediately accesses passive databases 350a-b to retrieve details 344a-b of the high priority event (step 326). This reading to retrieve details may be termed a "heavy poll" 342a-b, and may correspond to the traditional concept of passive database polling. In other embodiments, however, the heavy poll 342a-b may be an enhanced query that retrieves data objects based on the timestamps stored in timestamp list 330. As described in FIG. 6 and associated discussion, present embodiments may be configured to retrieve in an improved fashion, data objects from the passive database. FIG. 6 depicts an exemplary approach 600 to retrieving data objects from a monitored data store, as implemented by embodiments. FIG. 6 shows a timeline 630 of data object updates. Data objects 620a-d represent data objects that have been modified at particular points in time 625a-d. In embodiments, timestamp line 610 represents a timestamp value stored in timestamp list 330. Embodiments described herein may be configured to only retrieve those data objects 620 to the right of timestamp line 610 up to the present time 640. As described above, this timestamp line 610 represents the last time this particular data store was retrieved, e.g., timestamps stored in timestamp lists 150 and 330 described above. This optimized data object retrieval approach may also increase the performance of a passive email database.

The details retrieved by this heavy poll 342*a-b* may, for example, include the content of the data objects affected and other similar information. In step 328, event listener 320 stores the time at which passive databases 350*a-b* were last read in timestamp list 330.

As described above, many different uses for the retrieved data exist and would be known by one skilled in the art. For example, in step 332, event listener 320 provides the event and any related data to synchronization server 360.

Returning to step 324, if event listener 320 determines that no time stamp has been updated, it does not read passive databases 350*a-b* and proceeds to check if an amount of time has elapsed since passive databases 350*a-b* were last read (step 333).

If a pre-determined amount of time has elapsed (step 333), event listener 320 proceeds to read passive databases 350*a-b* (step 326). If a pre-determined amount of time has not elapsed (step 333), event listener 320 proceeds to wait and does not read passive databases 350*a-b* until the pre-determined amount of time elapses or until a time stamp is updated by passive databases 350*a-b* (step 334).

Figure 8:
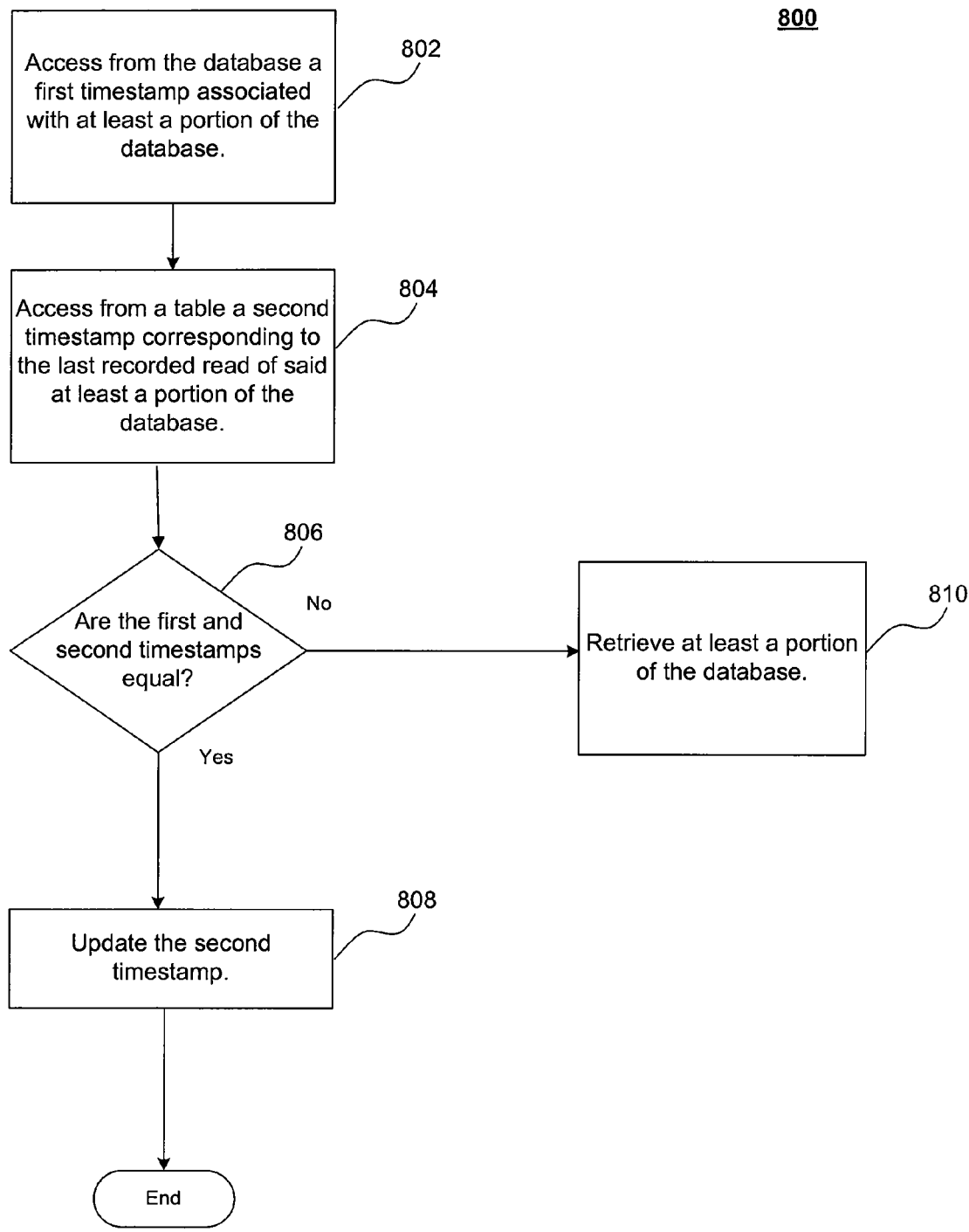
FIG. 8 is a flowchart of a method of retrieving updated information from the database using timestamps, according to another embodiment of the invention.

FIG. 8 also shows a method of retrieving updated information from the database using timestamps. The method includes accessing the database 350 to determine a timestamp associated with database objects (step 802). Then accessing a timestamp from, for instance timestamp list 330, corresponding to the last recorded read of the database 350 (step 804). Comparing the two timestamps (step 806), and if they are not equal, proceeding to step 810 where a portion of the database 350 is retrieved and the timestamp list 330 is updated (step 808).

V. Domino Embodiment

As described above, an example of a passive database implementation may be in an email server database. As an example, not intended to limit the invention, one such email server database that may operate in this passive fashion is the LOTUS DOMINO DATABASE from IBM, INC. ("Domino Database").

Figure 4:
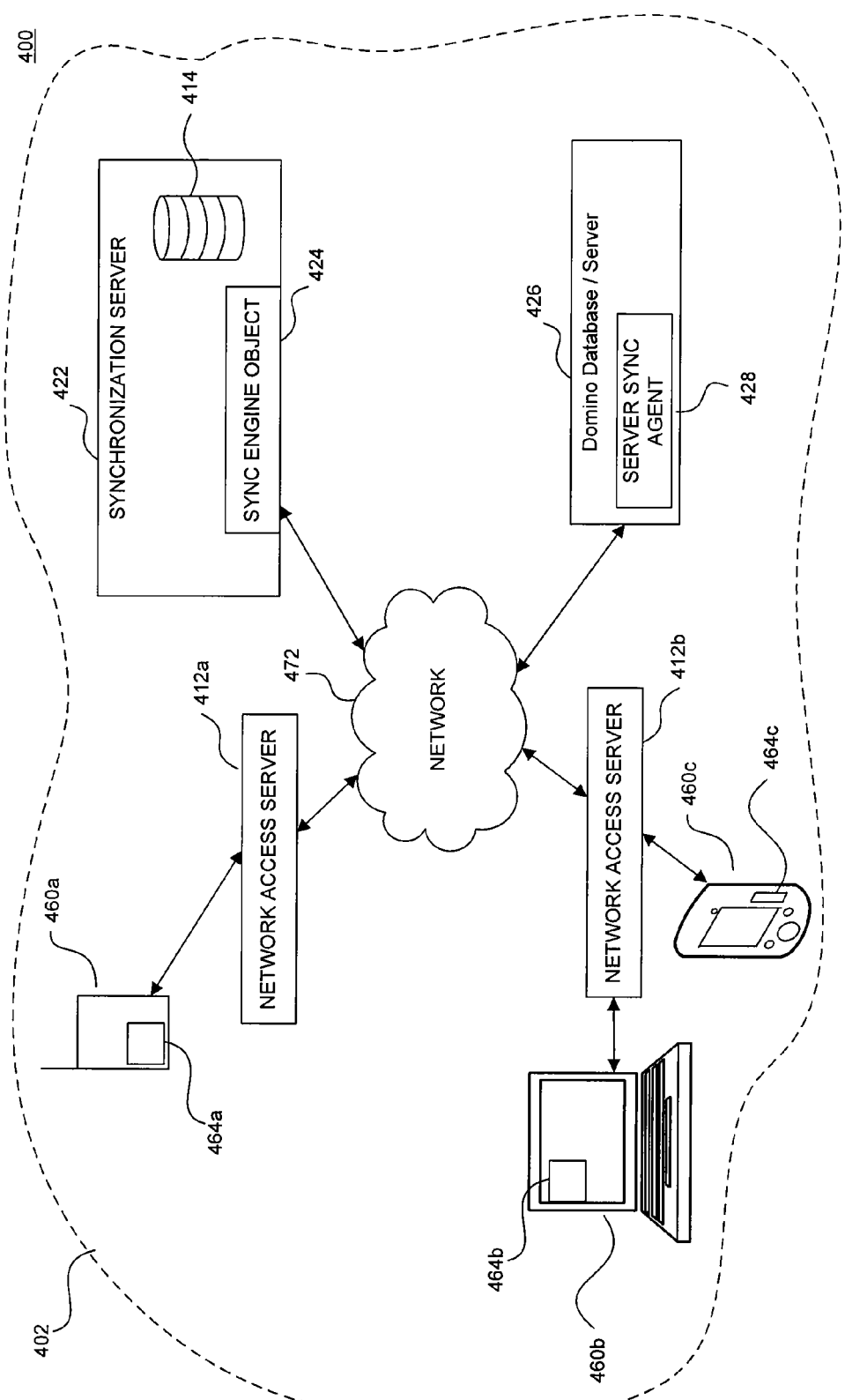
FIG. 4 depicts a mobile data environment, in accordance with an embodiment.

FIG. 4 depicts a mobile environment 400, which allows mobile devices 460*a-c* to synchronize email with Domino Database 426 over the Internet 402, in accordance with an embodiment of the present invention. While this embodiment is described in terms of emails, it is applicable to other data objects. One skilled in the relevant arts will also appreciate that any network, such as a corporate intranet, may be used instead of the Internet 402. Server sync agent 428 on Domino Database 426 synchronizes email delivery between mobile devices 460*a-c* and Domino Database 426 via network 472. Mobile device 460*a* accesses network 472 via network access server 412*a* in order to send and receive email to and from Domino Database 426.

Mobile devices 460*b* and 460*c* access network 472 via network access server 412*b* in order to synchronize email with Domino Database 426. This example email delivery architecture is further described in the Synchronization Application described above.

Sync engine object 424 also allows mobile devices 460*a-c* to receive current data available on synchronization server 422. Client sync agents 464*a-c* running on mobile devices 460*a-c* enable mobile devices 460*a-c* to upload current data to database 414 on synchronization server 422 for any given application or set of applications. For example, a calendar application might allow other users to add or make changes to appointments which are then stored on synchronization server 422. A user of mobile device 460*a* may also have added, deleted, or made changes to appointments within mobile device 460*a* itself.

In a typical mobile environment such as mobile environment 400, multiple mobile devices 460*a-c* synchronize with Domino Database 426 via synchronization server 422. Synchronization server 422 and Domino Database 426 need not be a single physical computer, and may in fact comprise several computers distributed over a number of physical and network locations. For the purposes of illustration, synchronization server 422 and Domino Database 426 are depicted as single points of access in mobile environment 400.

Figure 5:
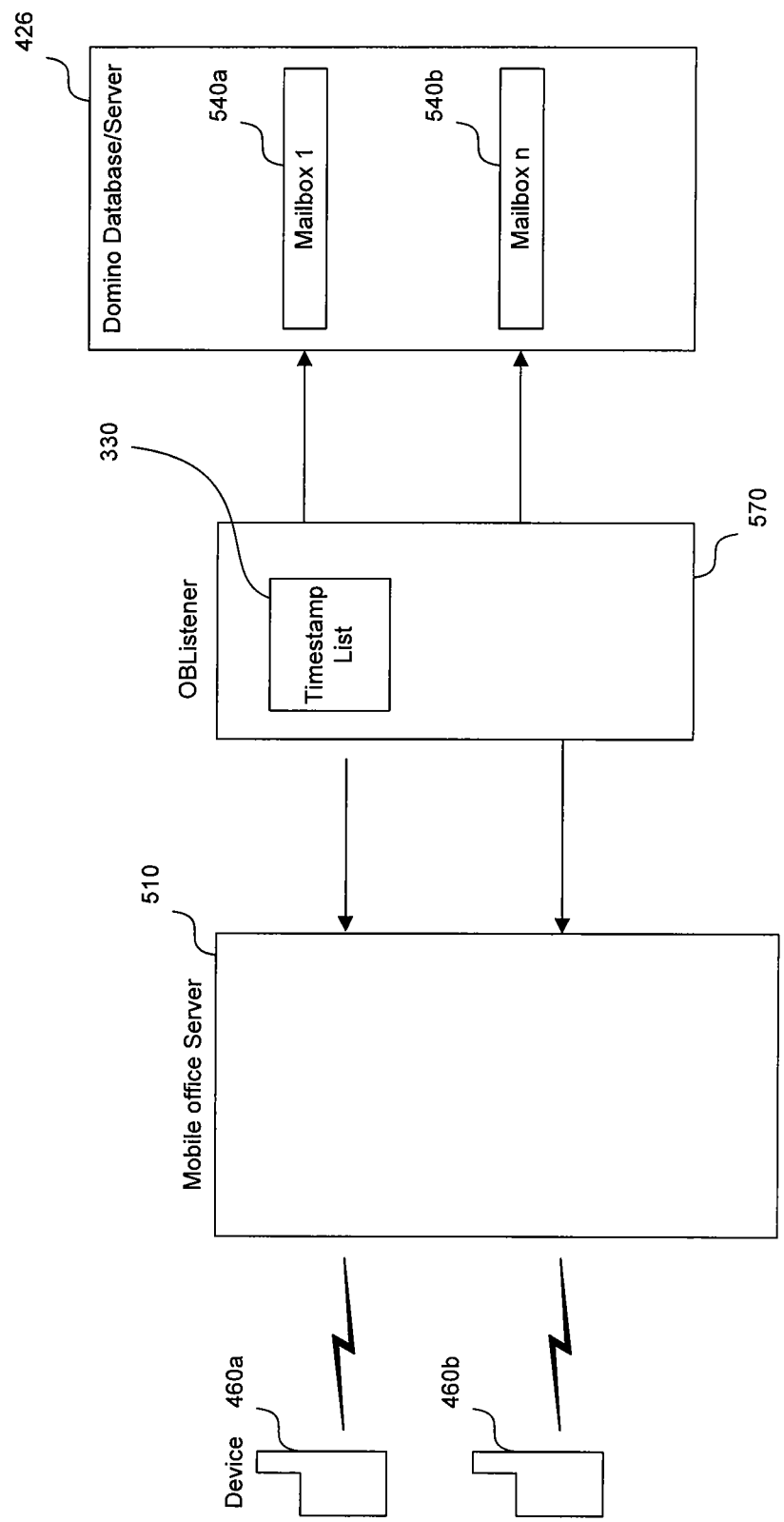
FIG. 5 depicts an active/push notification facade associated with an email database according to embodiments of the invention.

Turning to FIG. 5, Domino Database 426 contains mailboxes 540*a-b*. OBListener 570 described herein may be a component of the IANYWHERE MOBILE OFFICE product from SYBASE, INC. and may share functions with the event listeners 140 and 320 of FIGS. 1 and 3A respectively, although the invention is not limited to this example embodiment. In embodiments, OBListener 570 may be a Domino add-in component that tracks user events in a Lotus Domino system. In embodiments, OBListener 570 may use the teachings herein to "listen" for changes to data objects in passive Domino Database 426.

In FIG. 5, in the mail context, timestamp list 330 described above could contain information about each mailbox 540*a-b* on the Domino Database 426. Each mailbox 540*a-b* may contain collections of data objects for a single Domino user, e.g., emails, calendar appointments, application data, business process tasks, and other types of information. One skilled in the art will know the types of data objects that may be stored on a mail server.

In embodiments, OBListener 570 is configured to perform the methods 200 and 300 of FIGS. 2 and 3B, and may thus poll mailboxes 540*a-b* for timestamps, and detect changes by comparing poll data with timestamp list 330. Data objects may also be retrieved based on methods 200 and 300 as well. As described above with respect to general data objects, many different uses for the retrieved email server data objects exist and would be known by one skilled in the art. In embodiments, one such use may be to forward the retrieved data objects to mobile office server 510, then on to mobile devices 460*a-b*.

VI. Example Computer Embodiment

Figure 7:
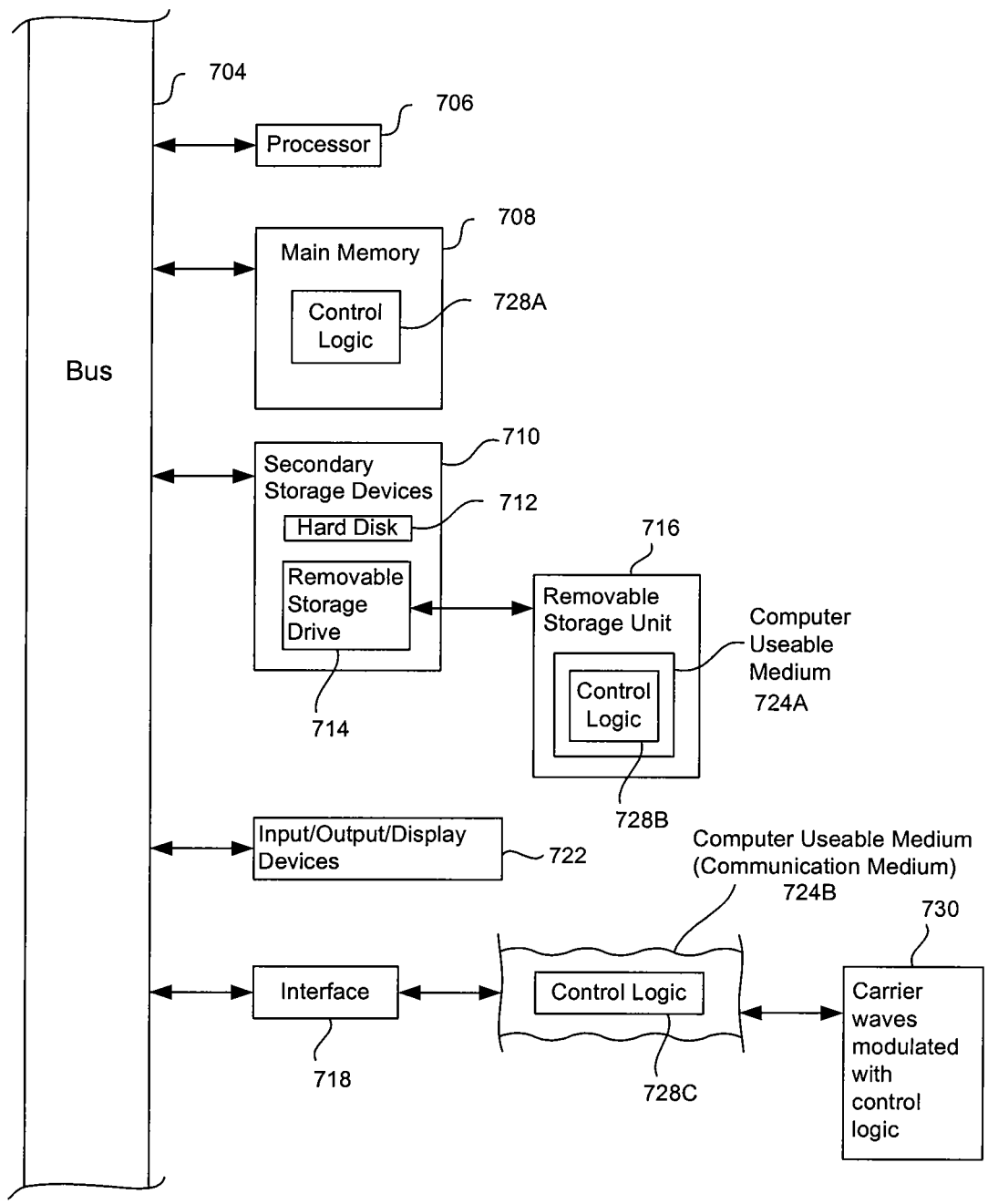
FIG. 7 illustrates an example computer system, useful for implementing components of embodiments of the invention.

In an embodiment of the present invention, the system and components of embodiments described herein are implemented using well known computers, such as computer 702 shown in FIG. 7. For example, synchronization server 120 or passive databases 350*a-b* can be implemented using computer(s) 702.

The computer 702 can be any commercially available and well known computer capable of performing the functions described herein, such as computers available from International Business Machines, Apple, Sun, HP, Dell, Compaq, Digital, Cray, etc.

The computer 702 includes one or more processors (also called central processing units, or CPUs), such as a processor 706. The processor 706 is connected to a communication bus 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or manufacture comprising a computer useable or readable medium having control logic (software) stored therein is referred to herein as a computer program product or program storage device. This includes, but is not limited to, the computer 702, the main memory 708, secondary storage devices 710, the removable storage unit 716 and the carrier waves modulated with control logic 730. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

VII. Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
   polling a database to detect a database data object event that occurred in the database, the detected database data object event associated with a database data object in the database;
   determining, upon the polling, a priority level of the database data object event to be a first priority level based on a type of the database data object event;
   determining, based on the determined priority level being the first priority level, to defer retrieving data related to the database data object from the database for a predetermined period of time, wherein the data related to the database data object associated with the first priority level is retrieved at the latest when the predetermined period of time elapses; and
   in response to determining, before the predetermined period of time elapses, that a subsequent database data object event occurred in the database and has a second priority level, retrieving the data associated with the first priority level along with data associated with the subsequent database data object event having the second priority level before the predetermined period of time has elapsed, and
   wherein the polling, determining the priority level, determining to defer retrieving, and retrieving are performed by one or more processors.

2. The method of claim 1, wherein the predetermined period of time is calculated based on a last time that the database was accessed.

3. The method of claim 1, wherein the database object event determined to have the first priority level corresponds to creating the database data object.

4. The method of claim 1, wherein the subsequent database object event determined to have the second priority level corresponds to retrieving the database data object.

5. The method of claim 1, wherein the database data object event is a first database data object event, further comprising:
   detecting an occurrence of a second database data object event associated with the database data object;
   determining a time interval between an occurrence of the first database data object event and the occurrence of the second database data object event; and
   determining whether to take an action based on the determined time interval.

6. The method of claim 5, wherein the action operates to retrieve data associated with the occurrence of the second database data object event, based on the determined time interval.

7. The method of claim 5, wherein the action taken is based on a determined priority level of the second database data object event.

8. A system, comprising:
a computer processor;
memory coupled to the computer processor;
an event listener, using the computer processor, configured to:
poll a database to detect a database data object event that occurred in the database, the detected database data object associated with a database object in the database,
upon detection of the database data object event occurrence during the polling, determine a priority level of the database data object event to be a first priority level based on a type of the database data object event, and
determine, based on the determined priority level being the first priority level, to defer retrieving data related to the database data object from the database for a predetermined period of time, wherein the data related to the database data object associated with the first priority level is retrieved at the latest when the predetermined period of time elapses; and
retriever configured to:
in response to determining, before the predetermined period of time elapses, that a subsequent database data object event occurred in the database and has a second priority level, retrieve the data associated with the first priority level along with data associated with the subsequent database data object event having the second priority level before the predetermined period of time has elapsed.

9. The system of claim 8, wherein the database data object event is a first database data object event, wherein upon detection of an occurrence of a second database data object event associated with the first database data object, an action is taken based on a determined time interval between an occurrence of the first database data object event and the occurrence of the second database data object event.

10. The system of claim 9, wherein the action taken is further based on a determined priority level of the second database data object event.

11. The system of claim 9, wherein the retriever is further configured to retrieve the data related to the first database data object, from the database, based on the determined time interval between the occurrences of the first and second database data object events.

12. The system of claim 8, wherein the predetermined period of time is calculated based on a last time that the database was accessed.

13. The system of claim 8, wherein the predetermined period of time is determined based on at least one of the database data object event, the determined priority level of the database data object event, and a determined time interval between the data object event and a different data object event.

14. The system of claim 8, wherein the database data object event determined to have the first priority level corresponds to creating the database data object.

15. The system of claim 8, wherein the subsequent database data object event determined to have the second priority level corresponds to retrieving the database data object.

16. A non-transitory computer-readable storage medium having computer-readable instructions encoded thereon that, when executed by a processor, cause the processor to perform a method, the method comprising:
polling a database to detect a database data object event that occurred in the database, the detected database data object event associated with a database data object in the database;
determining, upon the polling, a priority level of the database data object event to be a first priority level based on a type of the database data object event;
determining, based on the determined priority level being the first priority level, to defer retrieving data related to the database data object from the database for a predetermined period of time, wherein the data related to the database data object associated with the first priority level is retrieved at the latest when the predetermined period of time elapses;
in response to determining, before the predetermined period of time elapses, that a subsequent database data object event occurred in the database and has a second priority level, retrieving the data associated with the first priority level along with data associated with the subsequent database data object event having the second priority level before the predetermined period of time has elapsed.

17. The non-transitory computer-readable storage medium of claim 16, wherein the database object event determined to have the first priority corresponds to creating the database data object.

18. The non-transitory computer-readable storage medium of claim 16, wherein the subsequent database object event determined to have the second priority level corresponds to retrieving the database data object.

* * * * *